(No Model.)  8 Sheets—Sheet 1.

H. SCHIMPFF.
ELECTRICALLY PROPELLED AGRICULTURAL IMPLEMENT.

No. 582,237.  Patented May 11, 1897.

(No Model.) 8 Sheets—Sheet 3.
H. SCHIMPFF.
ELECTRICALLY PROPELLED AGRICULTURAL IMPLEMENT.

No. 582,237. Patented May 11, 1897.

Witnesses:
B. S. Ober.
M. J. L. Higgins.

Inventor
Hugo Schimpff.
By Henry Ott
Attorney

THE NORRIS PETERS CO., PHOTO-LITHO., WASHINGTON, D. C.

(No Model.) 8 Sheets—Sheet 4.

H. SCHIMPFF.
ELECTRICALLY PROPELLED AGRICULTURAL IMPLEMENT.

No. 582,237. Patented May 11, 1897.

(No Model.) 8 Sheets—Sheet 6.
H. SCHIMPFF.
ELECTRICALLY PROPELLED AGRICULTURAL IMPLEMENT.
No. 582,237. Patented May 11, 1897.

(No Model.) 8 Sheets—Sheet 8.

H. SCHIMPFF.
ELECTRICALLY PROPELLED AGRICULTURAL IMPLEMENT.

No. 582,237. Patented May 11, 1897.

Witnesses:
B. J. Ober,
M. J. L. Higgins

Inventor:
Hugo Schimpff
By Henry Orth
Attorney

UNITED STATES PATENT OFFICE.

HUGO SCHIMPFF, OF HALLE-ON-THE-SAALE, GERMANY.

ELECTRICALLY-PROPELLED AGRICULTURAL IMPLEMENT.

SPECIFICATION forming part of Letters Patent No. 582,237, dated May 11, 1897.

Application filed September 25, 1896. Serial No. 606,913. (No model.)

*To all whom it may concern:*

Be it known that I, HUGO SCHIMPFF, a subject of the Emperor of Germany, residing at Halle-on-the-Saale, Germany, have invented certain new and useful Improvements in Appliances for Transmitting Electric Energy to Electrically-Propelled Agricultural Implements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to such mechanically-driven plows or agricultural implements in which the plow or other implement is moved along a chain which is connected with two ground-anchors and stretched over the field by means of an electromotor arranged upon the framing of the plow and driving a chain-wheel over which the chain is led, guide-rollers in front and behind keeping the chain in proper engagement with the chain-wheel. The electromotor being switched in the proper direction of rotation, the plow is caused to travel along the chain across the field, being steered from the driver's seat.

In the drawings, $g$ are the ground-anchors. P is the carriage; E, the electromotor. C is the chain, passed over the chain-wheel $C^2$ of the carriage, and G G' are the guide-rollers in front and behind which keep the chain in engagement with the chain-wheel, so that when the electromotor is switched in the proper direction the plow is caused to travel accordingly along the chain across the field.

I have shown a tilting gang-plow as the agricultural implement to be driven—that is to say, a plow-frame P, having two gangs of plows set to operate in opposite directions, said frame being arranged in its supports so that it can be tilted when the direction of motion of the motor is reversed. I do not, however, desire to limit myself to this particular well-known form of agricultural implement, which is only given here as an example. The plow-frame carries in a well-known manner the electromotor E, and current is supplied to the electromotor E from any suitable source, which may be any distance from the field of operation, and is conducted thereto and returned to its said source, as a dynamo, through bare main conductors $a\ a'$, carried by insulators on poles $x$.

Figure 10:
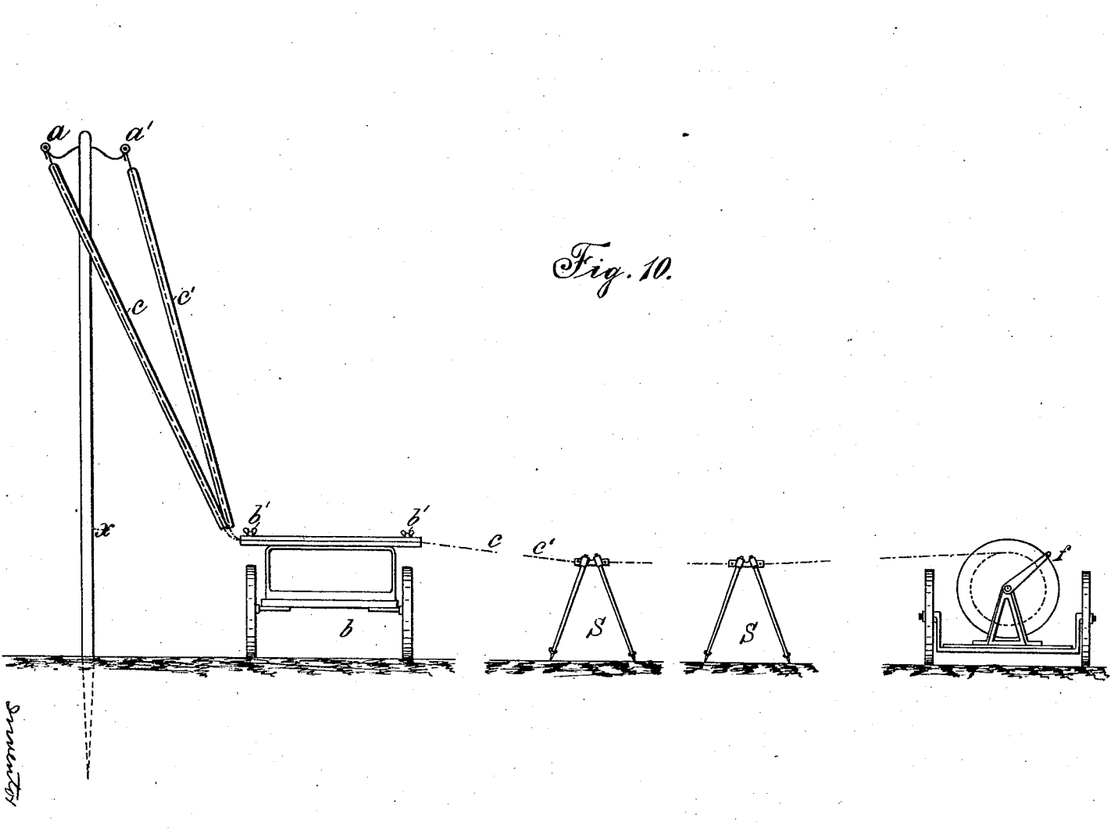
Fig. 10 is a side view showing the connection of the two cables with the main circuit and with a carriage at the one and other side of the field.
Figure 11:
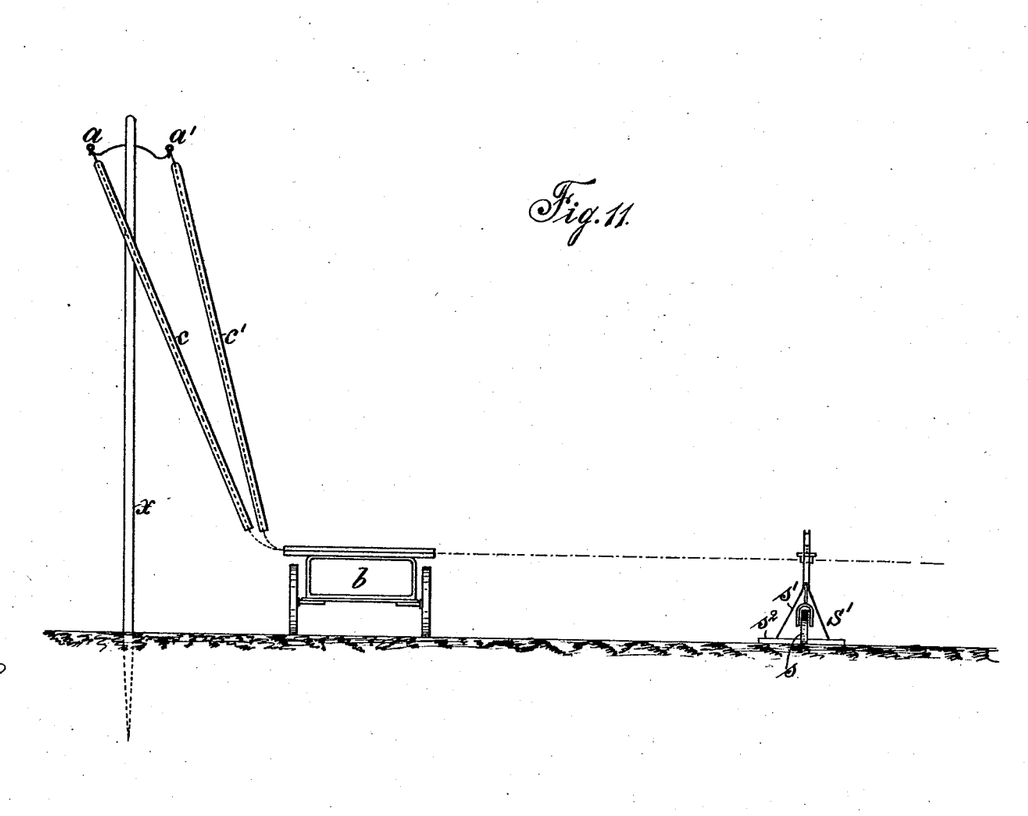
Fig. 11 is a side view illustrating a modification of the supports of the cables.
Figures 12, 13:
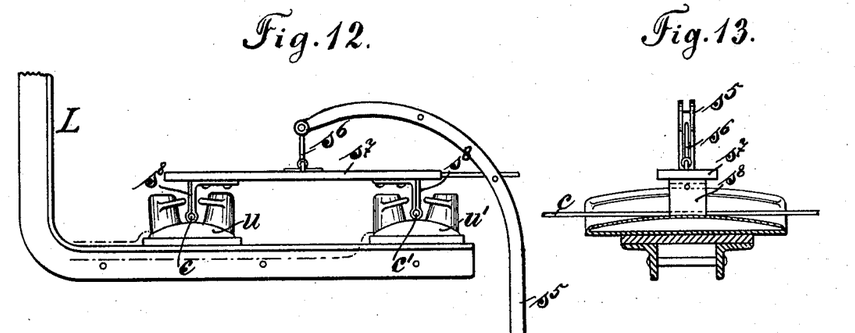
Fig. 12 is a side view of the upper part of this support and of the plow-carriage arm with insulators for the attachment of the cables.
Fig. 13 is a cross-section through said arm and its guide-shoes and the hanger-plate of the support.
Figure 14:
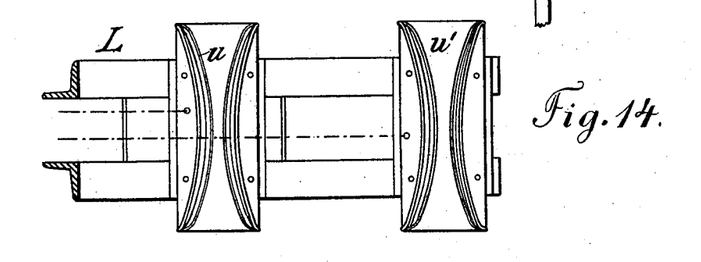
Fig. 14 is a sectional plan view of the end of the contact-arm.
Figure 15:
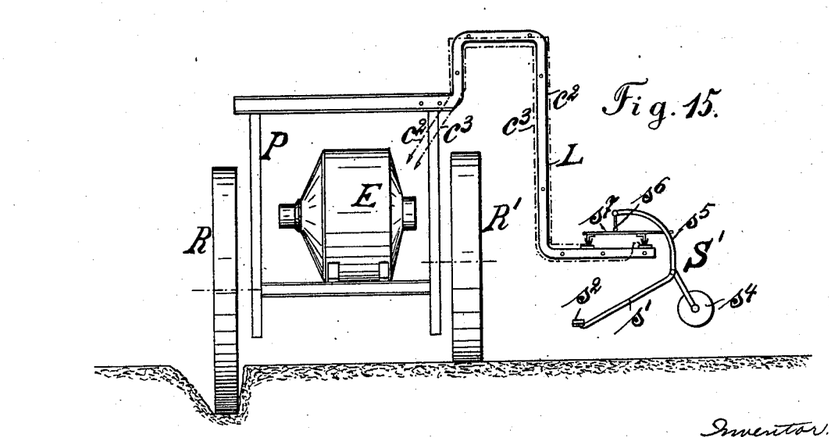
Fig. 15 is a fragmentary rear elevation of the motor-carriage, showing means for obtaining a sliding contact upon the cables.

The bare cables $c\ c'$, connected by suitable shiftable contacts with the main conductors $a\ a'$, are wound about a drum $f$ of non-conductive material, as wood, mounted upon a suitable carriage at one end of the field to be plowed, and are stretched from a carriage $b$ with clamps $b'$, to which they pass from the conductors, the arrangement being such as to avoid electrical connection between the two cables $c\ c'$.

Figure 1:
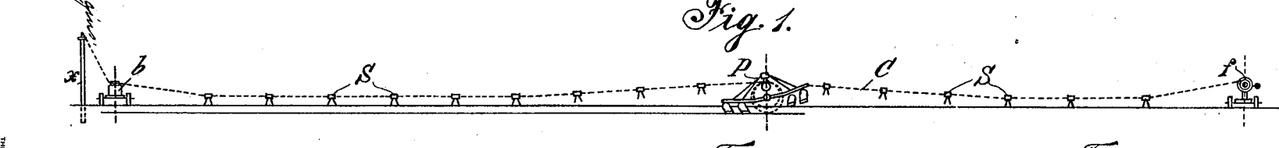
Figures 1, 2, and 3 are diagrammatic views, illustrating my invention by a side elevation, a top plan view, and an end elevation, respectively.
Figure 2:
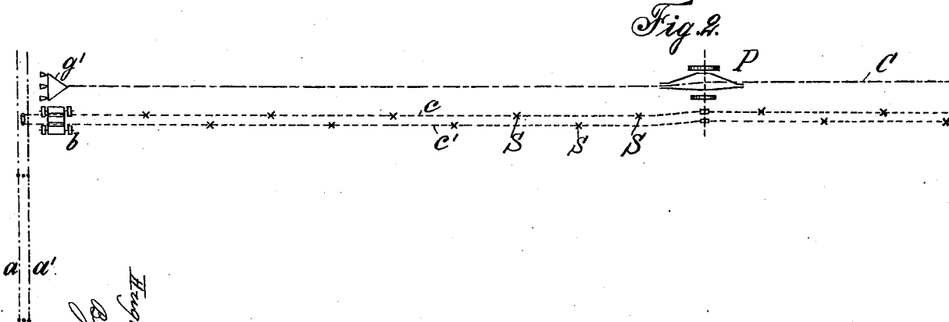
Figure 3:
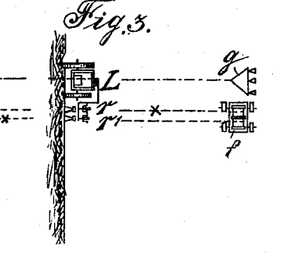
Figure 4:
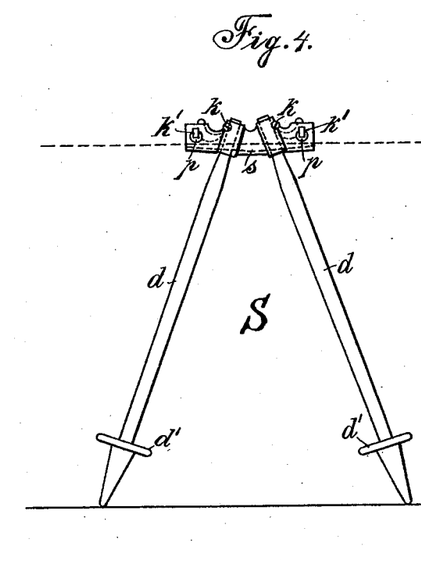
Figs. 4 and 5 are side and end elevations, respectively, of one of the supports for the bare field-conductors.
Figure 5:
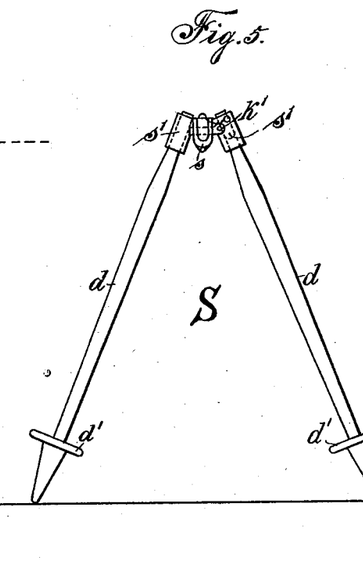

The cables $c\ c'$ are passed through a longitudinal opening formed in a conductive head $s$, Figs. 4 and 5, which constitutes the head of the cable-supports S, said head being provided with four sockets $s'$, for the reception of four legs $d$, each provided near the ground end with a circular flange $d'$, for the purpose of preventing the support S thus formed from sinking too deep into the ground. The legs $d$ are made of a non-conductive material, as wood, and are preferably keyed or pinned into their sleeves or sockets $s'$ by removable keys $k$, which in practice will be secured to the head $s$ by means of chains to prevent their becoming lost. The bare cables $c\ c'$ are likewise keyed to the head $s$ by means of keys $k'$, so as to obtain a perfect contact between the parts, said keys $k'$ being likewise secured to said head by chains.

By means of the construction described the support S can be readily dismembered for transportation. The under face of the head $s$ is a reverse incline substantially V-shaped in cross-section, and the space between the sockets $s'$ is sufficient to admit of the rolling contact of a trolley-wheel rolling along the said reversely-inclined under face of said head $s$.

Figure 6:
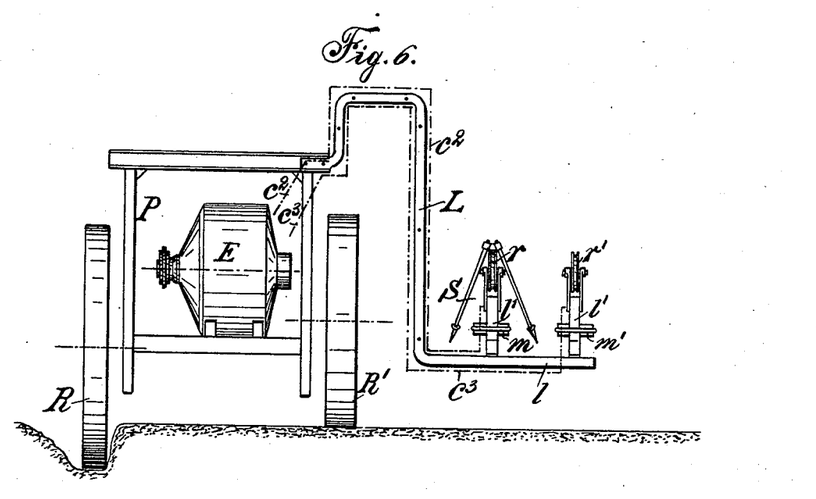
Fig. 6 is a fragmentary rear elevation of the motor-carriage for the agricultural implement, showing the operation of the rolling contact upon the cables and their supports.
Figure 7:
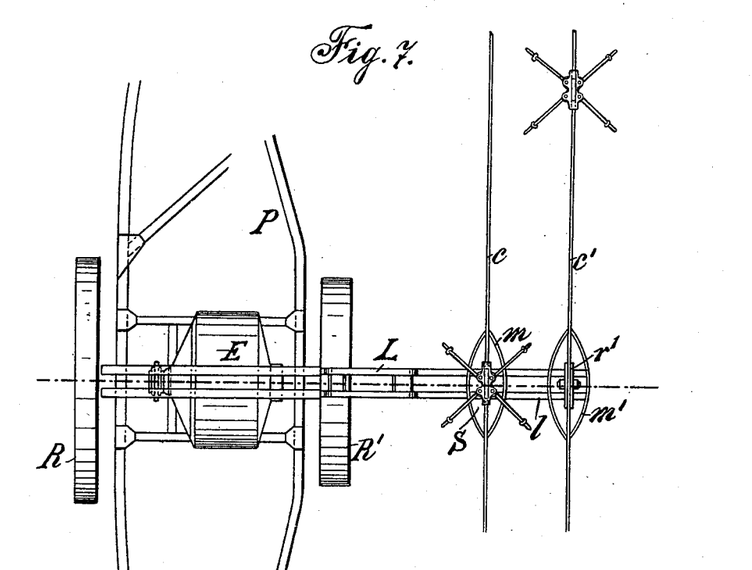
Fig. 7, a top plan view thereof.
Figure 8:
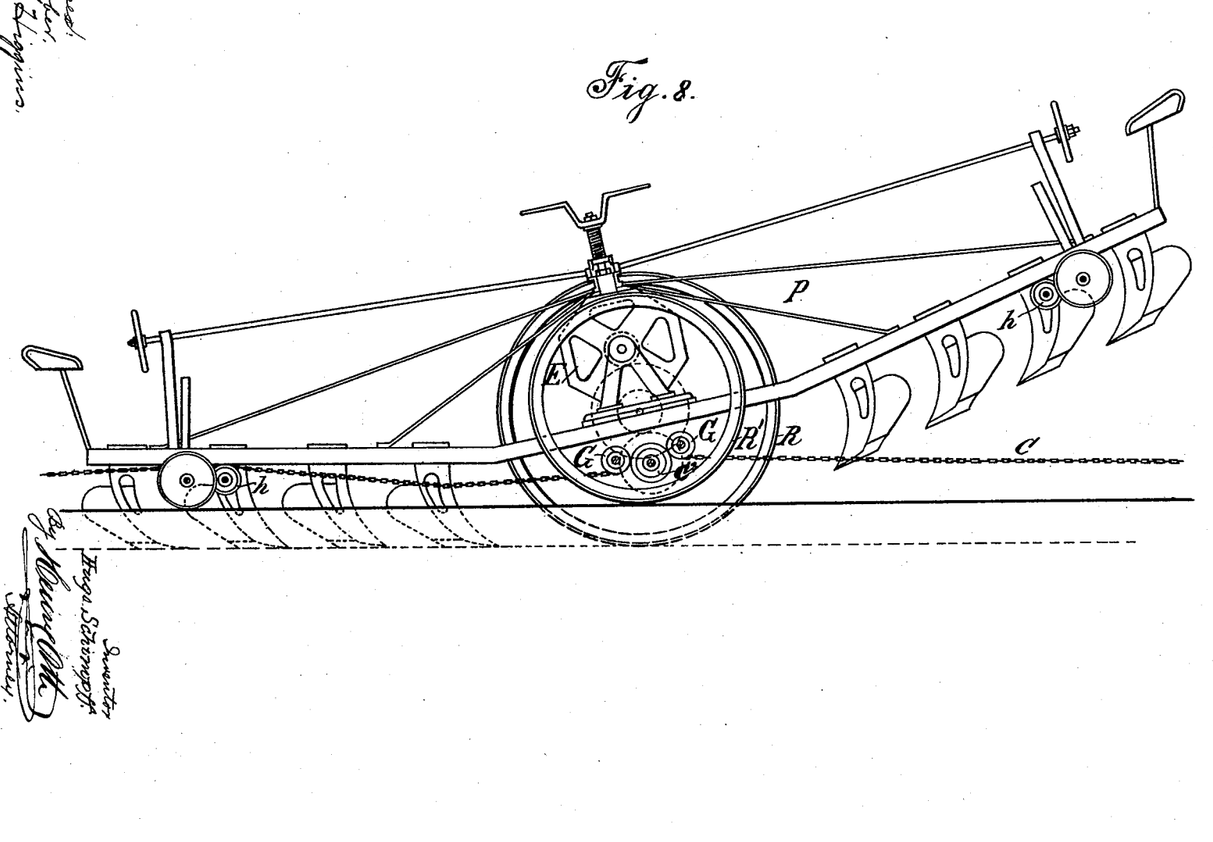
Fig. 8 is a front elevation of a plow provided with an electromotor.
Figure 9:
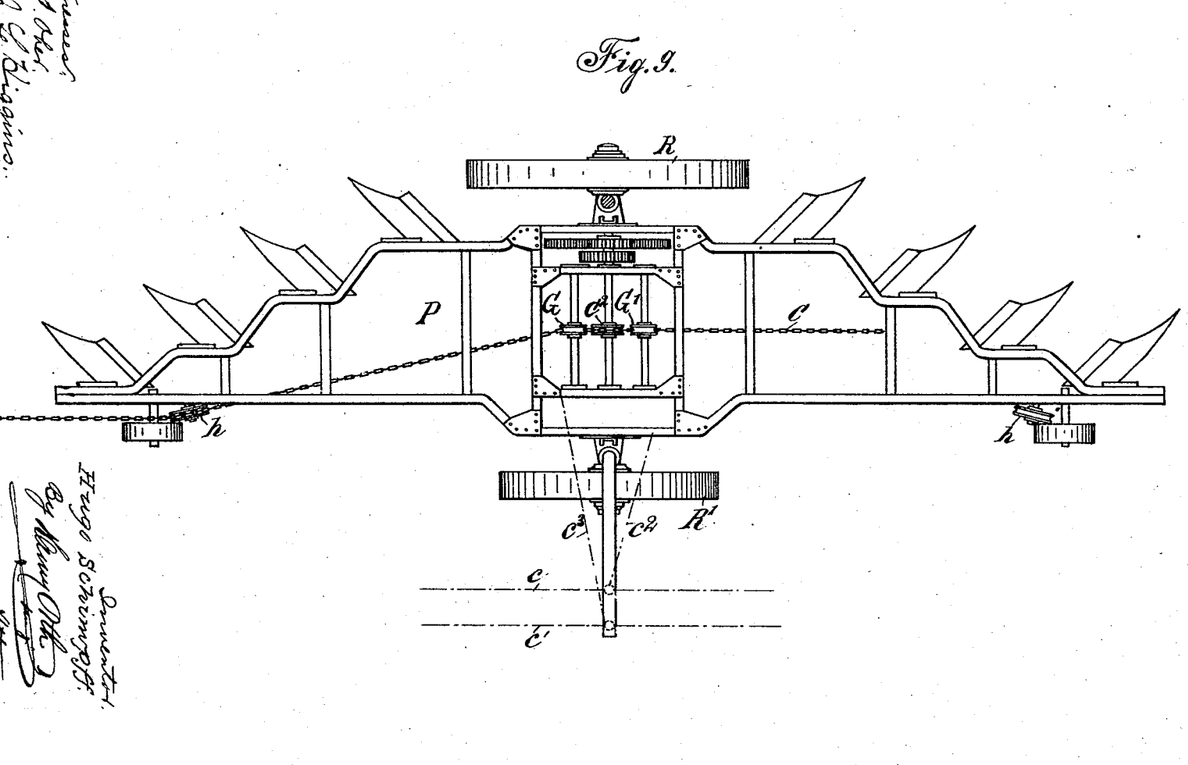
Fig. 9 is a plan of the plow, the electromotor being omitted.

The motor-carriage, which when a gang-plow is used has a furrow-wheel R and a land-wheel R', is provided with an outrigger L, from the horizontal arm $l$ of which project vertical standards $l'$, that are provided with bearings for two contact-trolleys $r$ and $r'$, one for each of the bare cables $c\ c'$. Each of said standards $l'$ below the trolleys $r$ and $r'$ is provided with an ellipsoidal open frame $m$ and $m'$, respectively, whose smaller ends lie in the direction of motion of the plow.

The plow or agricultural implement is, as usual, moved by the electromotor E along a chain C, secured to anchors $g$ at opposite ends of the field to be cultivated or plowed, said chain passing over the chain-wheels $C^2$ of the plow-carriage P, which are driven by the electromotor E by suitable gearing.

The supports S for the cables $c\ c'$ are arranged at suitable distances apart, say at a distance of about six meters from one another.

The operation of the system may be briefly described as follows: Assuming $a$ and $c$ to be the positive main and field conductors and $a'\ c'$ the negative or return main and field conductors, respectively, so that the current from the source of supply of electric energy will flow from main conductor $a$ to field-conductor $c$, to trolley $r$, to electromotor E on carriage P and back from the motor to trolley $r'$, to cable $c'$, and thence through main conductor $a'$ to the negative pole of the said source of supply of electric energy, as the motor and plow, with the outrigger L, move along the field from one conductor-support S to another the contact-trolleys $r\ r'$ travel along the reverse inclines of the under face of the heads $s$ of said supports, thereby lifting the latter clear of the ground, Fig. 6, until the said trolleys have moved clear of the heads $s$, when the supports S drop back and again sink into the ground, the supports being held against too much swinging to and fro on the trolleys $r$ and $r'$ when lifted clear of the ground by the ellipsoidal frames $m$ and $m'$, arranged on the arms $l'$ of the outrigger at a suitable distance below said contact-trolleys.

In the modification, Figs. 11 to 15, instead of trolley-wheels for producing a rolling contact on the cables, means are shown by which a sliding contact is obtained. The supports S' are here provided with legs $s'$, carrying a ground-bar $s^2$, and with an opposite leg $s^3$, carrying a wheel $s^4$, by means of which they can be moved easily over the field. The standard $s^5$, to which these legs are connected, is bent over the legs $s'$ and carries, by means of a link $s^6$, a supporting-bar $s^7$, at the under side of which the two cables $c\ c'$ are lodged in suitable holders $s^8$. The outrigger L in this case carries contact-shoes $u\ u'$, which slide under the cables $c\ c'$ and their holders, thereby lifting the supports clear of the ground, Fig. 15. The current is conducted from and returned to the main conductors $a\ a'$ by means of movable clamps to the cables $c\ c'$, from which latter the current passes through wires $c^2\ c^3$ to the electromotor E.

By the described arrangement a very simple and efficient means is provided for maintaining the electromotor in constant electrical connection with the respective field-conductors, the use of expensive insulated conductors which must be moved with the carriage being avoided. Of course the cables, with their carriages $b$ and $f$, the motor-carriage P, and the chain and its anchors are shifted laterally the required distance whenever the agricultural implement reaches one or the other end of the field, or, in other words, whenever a series of furrows have been plowed, the plow being tilted at each operation, as will be readily understood. It will also be understood that instead of a return-conductor the earth may be used as such, though I prefer to use two main and two field conductors.

Having thus described my invention, what I claim as new therein, and desire to secure by Letters Patent, is—

1. Means for transmitting electric energy to electrically-driven agricultural implements, comprising a bare conductor, portable supports therefor provided with a conductive track electrically connected with said conductor, a motor-carriage, and a rigid sliding contact on said carriage adapted to slide along said bare conductor and along the under side of the conductive track of its supports, for the purpose set forth.

2. Means for transmitting electric energy to electrically-driven agricultural implements, comprising a bare conductor, movable supports therefor consisting of a conductive head and non-conductive legs to which head the bare conductor and legs are secured, a motor-carriage and a contact thereon adapted to travel along the under face of the conductive head of the aforesaid supports for the purpose set forth.

3. Means for transmitting electric energy to electrically-driven agricultural implements, comprising a bare conductor, movable supports therefor consisting of a conductive head and non-conductive legs, to which head the bare conductor and legs are secured, a motor-carriage and a contact thereon adapted to travel along said bare conductor and along the under face of the conductive head of the aforesaid supports, the aforesaid contact operating to lift the supports clear of the ground and drop the same as said contact moves into and out of contact with their conductive heads, for the purpose set forth.

4. Means for transmitting electric energy to electrically-driven agricultural implements, comprising a bare conductor, movable supports therefor consisting of a conductive head and non-conductive legs, to which head said conductor and legs are secured, the under face of said head being substantially V shape in section and forming a reversely-inclined track, in combination with a motor-carriage, a contact thereon adapted to travel along the bare conductor and along the said reversely-inclined conductive track and in so doing lift the said supports clear of the ground and then drop the same again, for the purpose set forth.

5. Means for transmitting electric energy to electrically-driven agricultural implements, comprising two bare conductors, movable supports therefor provided with a conductive head, electrically connected with the conductors, and a motor-carriage carrying contacts adapted to travel along said conductors and along the conductive heads of their respective supports and to lift said supports clear of the ground and drop the same as said contacts move into and out of contact with the conductive heads, for the purpose set forth.

6. Means for transmitting electric energy to electrically-driven agricultural implements, comprising two bare conductors and movable supports therefor provided with a conductive head electrically connected with the conductors, and non-conductive legs, in combination with a motor-carriage, an outrigger thereon provided with vertical arms, rolling contacts, one for each conductor, mounted on said arms, and an ellipsoidal frame carried by the arms below the rolling contacts, the latter adapted to travel along the under face of the aforesaid conductive heads and between the legs thereof, and when so doing lift the supports above-ground and again drop them, the aforesaid frames holding the supports against vibration when so lifted and dropped, for the purpose set forth.

7. The combination with a bare conductor, of a portable support comprising a head of conductive material through which the conductor is threaded, and legs of a non-conductive material, for the purpose set forth.

8. The combination with a bare conductor, of a support comprising a head of a conductive material through which the conductor is threaded, one or more keys or wedges for keying the conductor to such head, and legs constructed of an insulating material and provided near their lower end with a circular flange, substantially as and for the purpose set forth.

9. The combination with a bare conductor, of a support comprising a head of conductive material through which the conductor is threaded, one or more movable keys or wedges for wedging the conductors firmly to said head, and legs constructed of a non-conductive material detachably connected with said head and provided near the ground end with circular flanges, for the purpose set forth.

In testimony that I claim the foregoing as my invention I have signed my name in presence of two subscribing witnesses.

HUGO SCHIMPFF.

Witnesses:
RUDOLPH FRICKE,
PAUL FIEBIG.